(12) United States Patent
Godi et al.

(10) Patent No.: US 11,560,708 B2
(45) Date of Patent: Jan. 24, 2023

(54) 3D CONCRETE PRINTER

(71) Applicant: Université Clermont Auvergne, Clermont-Ferrand (FR)

(72) Inventors: Gaël Godi, Romagnat (FR); Laurent Phelippe, Clermont-Ferrand (FR); Sofiane Amziane, Clermont-Ferrand (FR)

(73) Assignee: Université Clermont Auvergne, Clermont-Ferrand (FR)

( * ) Notice: Subject to any disclaimer, the term of this patent is extended or adjusted under 35 U.S.C. 154(b) by 265 days.

(21) Appl. No.: 16/492,385

(22) PCT Filed: Mar. 8, 2018

(86) PCT No.: PCT/FR2018/050542
§ 371 (c)(1),
(2) Date: Sep. 9, 2019

(87) PCT Pub. No.: WO2018/162858
PCT Pub. Date: Sep. 13, 2018

(65) Prior Publication Data
US 2020/0040567 A1     Feb. 6, 2020

(30) Foreign Application Priority Data

Mar. 9, 2017    (FR) ...................................... 1751938

(51) Int. Cl.
*B33Y 10/00*    (2015.01)
*E04B 1/35*     (2006.01)
*B33Y 30/00*    (2015.01)
*B33Y 50/02*    (2015.01)
*B33Y 70/00*    (2020.01)
*E04B 1/16*     (2006.01)
*E04G 21/04*    (2006.01)

(52) U.S. Cl.
CPC ................ *E04B 1/35* (2013.01); *B33Y 10/00* (2014.12); *B33Y 30/00* (2014.12); *B33Y 50/02* (2014.12); *B33Y 70/00* (2014.12); *E04B 1/16* (2013.01); *E04G 21/0427* (2013.01); *E04B 2001/3588* (2013.01)

(58) Field of Classification Search
CPC ...... E04B 1/35; E04B 1/16; E04B 2001/3588; B33Y 10/00; B33Y 30/00; B33Y 50/02; B33Y 70/00; E04G 21/0427
See application file for complete search history.

(56) References Cited

FOREIGN PATENT DOCUMENTS

DE    102014015335    4/2016
FR    3029811         6/2016

OTHER PUBLICATIONS

International Search Report (English Translation provided) and Written Opinion for PCT/FR2018/050542 dated May 30, 2018.

*Primary Examiner* — Larry W Thrower
(74) *Attorney, Agent, or Firm* — Patterson Thuente, P.A.

(57) ABSTRACT

A mobile 3D printing device, system and method based on the addition of material intended to be attached to a lifting device with a single lifting cable or chain, including
 a printing head adapted to receive material and depositing it;
 fixing means adapted to link the printing head to the lifting device, and
 stabilization means adapted to stabilize the position of the printing head by a gyroscopic effect.
The printing device enables the control of the printing of a structure to be printed, in particular the position of the printing head, to reduce the labor costs and the time to install such a device on a standard crane provided with a hook.

13 Claims, 8 Drawing Sheets

3D CONCRETE PRINTER

This present application is a National Phase entry of PCT Application No. PCT/FR2018/050542 filed Mar. 8, 2018 which claims priority to French Application No. 1751938 filed Mar. 9, 2017, the contents of each being incorporated herein by reference in their entireties.

TECHNICAL FIELD

The present invention relates to the printing of structures by the deposition of materials such as mortar.

More specifically, the invention relates to a device, a system and a method for the 3D printing of structures by material deposition.

BACKGROUND

Three-dimensional printing makes it possible to produce a real object by additive manufacturing methods, that is to say by the successive deposition of layers of material.

Initially used for the rapid prototyping of objects, 3D printing is now used to manufacture functional parts and specifically in a variety of fields such as the construction of buildings or edifices.

The benefit of 3D printing for the construction of buildings is the 30 to 60% reduction of construction waste and a shortening of the production lead times by 50 to 70% compared to a conventional method.

Currently, there are several types of technologies for the construction of buildings. Some technologies use gantry systems running on rails which support the printing head of the printer and which bracket the construction zone. These are 3D printing scalings of "small size" generally used for the printing of objects made of plastics or metals that are of "small size". The drawback with this type of technology is the bulk and the need to have a structure of large size which encompasses the building to be "printed".

To resolve this problem, another type of 3D printer for building uses a robotic arm allowing the 3D printer to be displaced at the center of the construction zone and avoid the installation of a gantry and rails.

To overcome the abovementioned limitations caused by the use of a robotic arm or a gantry running on rails, in terms of height and of action perimeter, new 3D printing systems have emerged and now make it possible to be fixed to a crane, of lattice structure type. These systems are voluminous, heavy and their installation is complex because it generally requires adapting the crane fixing system for each printing system. Furthermore, this kind of printer poses problems of stability and of energy deployed to pump the material to be deposited to the top of the crane and the printing head.

There is therefore a real need for a printing system that mitigates these defects, drawbacks and obstacles of the prior art, in particular a device that makes it possible to control the conditions of printing of the structure to be printed, in particular the position of the printing head, to reduce the labor costs and the time to install such a device on a standard crane provided with a hook.

SUMMARY

To resolve one or more of the abovementioned drawbacks the subject of the invention is a mobile 3D printing device based on addition of material intended to be attached to a lifting device with a single lifting cable or chain, the mobile 3D printing device comprising:
- a printing head adapted to receive material and depositing it;
- fixing means adapted to link the printing head to the lifting device; and
- stabilization means adapted to stabilize the position of the printing head by a gyroscopic effect.

These stabilization means thus make it possible to control the position of the printing head despite the external disturbances such as the wind, in particular when the printing head is suspended on a cable.

Advantageously, the stabilization means are adapted to act on the position of the fixing means. By neutralizing the unexpected variations of position of the fixing means, for example a crane hook to which the printing device could be attached, the efforts to be implemented to then control the position of the printing head itself are minimized.

Advantageously, the stabilization means comprise at least three gyroscopes, adapted to stabilize the position of the printing head by a gyroscopic effect, making it possible to increase the reliability of the stabilization system.

Advantageously, to increase the stability in case of use of the printing device in environmental conditions exhibiting strong disturbances, the stabilization means can comprise complementary stabilization means comprising at least three turbines adapted to stabilize the position of the printing head by air flow, the three turbines being distributed angularly equidistantly from a substantially vertical lifting axis (V) defined by the single lifting cable or chain of the lifting device.

The device can also include an actuator adapted to rotate the printing head about an axis of rotation called vertical (V) at right angles to the plane defined by the three gyroscopes, so as to give a first degree of freedom to the printing head, namely a rotation, the stabilization means being adapted to neutralize the disturbances generated by the rotation of the printing head and ensure the stability of the printing head during the rotation.

Advantageously, the device can include displacement means comprising a first translation system adapted to displace the printing head along an axis (H) at right angles to the vertical axis (V) and thus allowing the printing head to have a second degree of freedom, a translation. In that case, the first translation system can comprise a balancing weight adapted to maintain the equilibrium of the first translation system as a function of the position of the printing head on the axis (H) of the first translation system. This weight thus makes it possible to prevent the horizontal translation system from leaning because of the weight of the printing head and therefore to keep the horizontal translation system horizontal.

So as to make the mobile 3D printing device as compact as possible, the first translation system can be composed of an articulated arm allowing the displacement of the printing head along the axis (H) at right angles to the vertical axis (V).

In order to give the printing head a third degree of freedom, in this case a second translation, the displacement means can further comprise a second translation system adapted to displace the printing head along the vertical axis (V).

To be able to automate the printing of a structure, the mobile 3D printing device can further comprise:
- location means adapted to determine in real time the position of the printing head in a geometrical reference frame specific to the structure to be printed; and a processing unit adapted to servo-control the position of the printing head as a function of its location in the geometrical reference frame of the structure to be printed.

Advantageously, the location means comprise:

a spotting system adapted to know the absolute position of a reference point in the geometrical reference frame of the structure to be printed; and a set of sensors adapted to make it possible to locate the position of the printing head relative to the reference point, the processing unit being adapted to calculate the position of the printing head in the geometrical reference frame of the structure to be printed using the data from the spotting system and the data from the set of sensors.

According to particular embodiments, that can be used alone or in combination:

the printing head is connected to a material supply tube, for example mortar, the arrival of which being made along the vertical axis (V), which makes it possible to reduce the influence of the arrival of the material on the device as the balancing effect. In that case, the mortar supply tube can be linked to a concrete pump comprising an output tube, the two tubes being linked by a combination of revolving joints, so as to avoid the frictions that risk rotating the device about the vertical axis (V), or about the hook in the case where the device would be suspended from a crane hook;

the printing head can be provided with a revolving nozzle allowing for a non-rectilinear deposition of the material, and consequently reinforcing and rigidifying the structure to be printed.

In a second aspect, the invention relates also to a 3D printing system for the construction of a structure by the deposition of layers of material comprising:

a mobile 3D printing device according to one of the embodiments described above; and a lifting device capable of suspending and displacing the 3D printing device.

Another aspect of the invention relates to a method for the 3D printing of a structure, such as a building, by a printing system as described previously, comprising:

a first step consisting in defining, using the location means, at least one reference point in the geometrical reference frame of the structure to be printed, such that the processing unit can define the position of the printing head in the geometrical reference frame of the structure to be printed; and a second step of printing of the structure consisting in supplying the printing head with construction materials, of concrete or mortar or cement type, and in activating the servo-controlling of the position of the printing head by the processing unit as a function of the form of the structure to be printed.

BRIEF DESCRIPTION OF THE FIGURES

The invention will be better understood on reading the following description, given purely by way of example, and with reference to the attached figures in which.

DEFINITIONS

Hereinafter in the description, a lifting device is understood to be a lifting device of crane, overhead travelling crane or telescopic lifting carriage type comprising a single lifting cable or chain.

The single lifting cable or chain defines a substantially vertical lifting axis.

In the case where the single lifting cable or chain is strung up, that is to say in the case where the single lifting cable or chain pass through several pulleys to multiply the lifting forces, the lifting axis corresponds to the resulting median axis.

DETAILED DESCRIPTION

Figure 1:
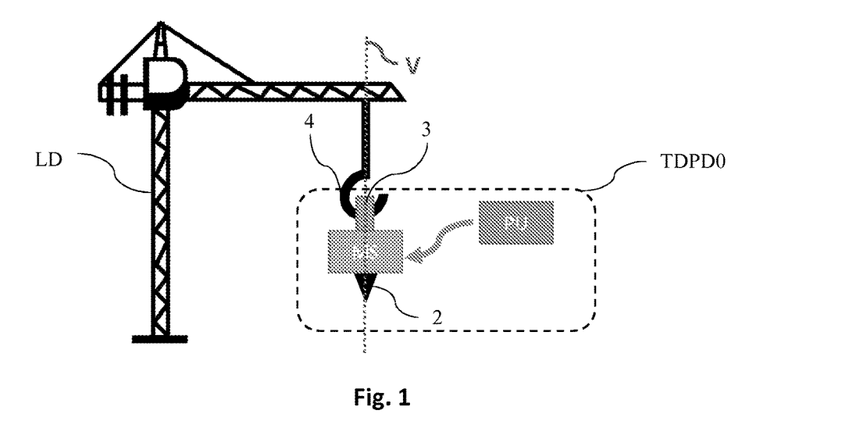
FIG. 1 represents an overview of a printing device according to a general embodiment of the invention.

According to FIG. 1, which represents a general embodiment of the invention, the mobile three-dimensional printing device (3D) TDPD0 based on the addition of material comprises:

a printing head 2 adapted to receive material, such as mortar or concrete, and depositing it;

fixing means 3 adapted to link the printing head 2 to a lifting device LD, and stabilization means MS adapted to stabilize the position of the printing head 2 by a gyroscopic effect.

In order to be easy to use, the fixing means 3 of the printing device TDPD0 are adapted to the standard lifting devices of crane, travelling overhead crane or telescopic lifting carriage type. In particular, the fixing means 3 of the device are compatible with the attachment systems of these lifting devices such as a crane hook 4, so that no particular adjustment of the lifting device has to be performed for the fitting of the mobile printing device TDPD0. For example, the fixing means comprise a ring in which the crane hook 4 of the lifting device LD is attached.

Thus, the mobile printing device TDPD0 can be suspended on a crane cable (or chain), that is to say a structure that is not rigid or has little rigidity, using a crane hook 4 and its fixing means 3.

Inherently in such a mounting, on a structure that is not rigid or has little rigidity, the mobile printing device TDPD0 can be subject to different disturbances. In the context of the construction of a building, these disturbances can originate from environmental disturbances (for example: the wind), from forces generated by the addition of material to the printing head 2, from the reaction of the material upon its deposition, or from the "spring" effect of the cable of the crane.

In order to control the deposition of material, it is necessary to stabilize the position of the printing head 2 through which the material actually leaves. This stabilization is performed using stabilization means MS, which can act directly on the printing head 2. However, the inventors have noted that it could be particularly advantageous for the stabilization means MS to act on the position of the fixing means 3.

Figure 2:
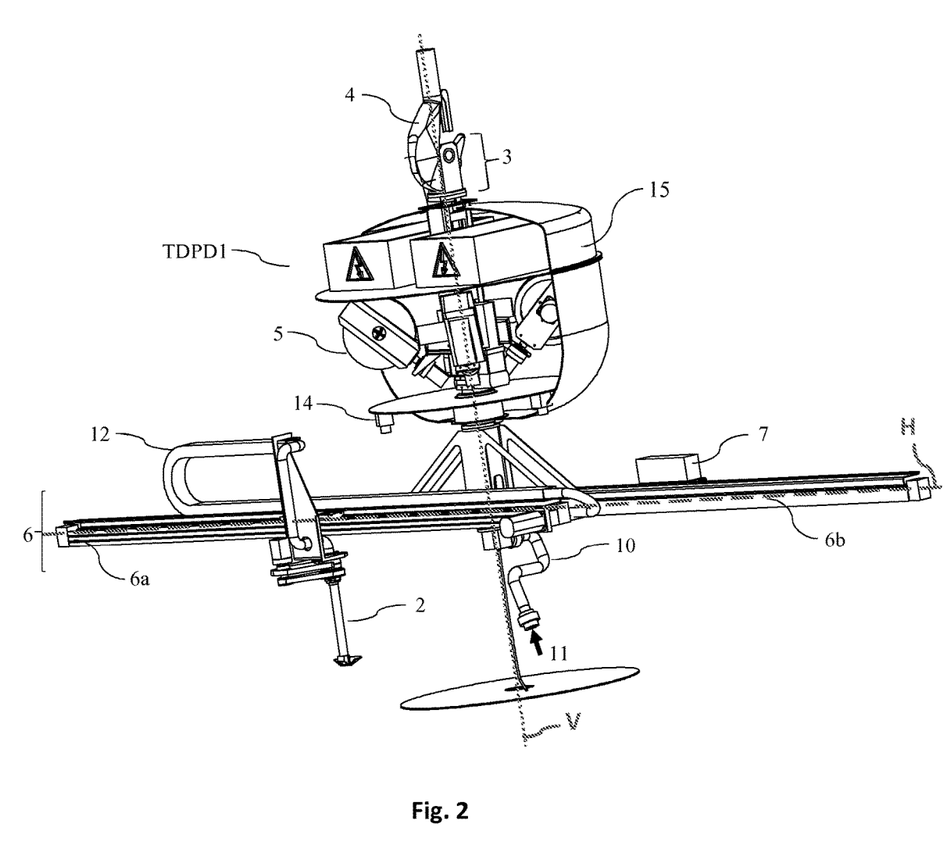
FIG. 2 represents an overview of a printing device according to a first variant of the general embodiment of the invention.

Indeed, with the stabilization being ensured by a gyroscopic effect, the more closely that is applied to the point most sensitive to disturbances, as in FIG. 2, the less it will be necessary to deploy forces to neutralize the disturbances. As far as is possible, it is therefore advantageous for the stabilization means MS to act on the position of the fixing means 3, the rest of the device TDPD0 having an inertia and an intrinsic stability very much greater than that of a crane hook 4 suspended at the end of a cable or of a chain.

FIGS. 2 to 7 and FIG. 10 represent a printing device according to different variants TDPD1, TDPD2, TDPD3 and TDPD4 of the general embodiment of the invention, in which the stabilization means MS comprise at least three gyroscopes 5 adapted to stabilize the position of the printing head 2 by a gyroscopic effect. For safety reasons and also for a good equilibrium of the device, a fourth gyroscope can be used so as to be able to ensure the stability of the printing head 2, as illustrated in FIGS. 2 to 7.

According to a particular embodiment, the four gyroscopes 5 are positioned in one and the same plane P and operate symmetrically, pairwise, so as to control the pitch and the roll of the plane P defined by the center of the gyroscopes, and such that the printing head 2 remains in a horizontal plane relative to the ground despite disturbances. FIGS. 2 to 7 illustrate such a type of mounting.

Advantageously, the gyroscopes can be inclined relative to the vertical axis V, which improves the stability of the assembly, as illustrated in FIGS. 4 to 7. The vertical axis (V) corresponds to the substantially vertical lifting axis defined by the single lifting cable or chain of the lifting device LD.

According to one option, the device TDPD0, TDPD1, TDPD2, TDPD3 or TDPD4, can comprise an actuator adapted to rotate the printing head 2 about an axis of rotation, called vertical V, at right angles to the plane defined by the three (or four) gyroscopes 5 so as to allow the printing head 2 to have a first degree of freedom, namely a rotation about the vertical axis V. Since the rotation of the printing head 2 can generate disturbances, the stabilization means must be adapted to neutralize these disturbances and ensure the stability of the printing head during the rotation. They must in particular produce a reaction torque which makes it possible to overcome the inertia of the printing device during the rotation of the printing head. As indicated previously, this axis of rotation or vertical axis V corresponds to the substantially vertical lifting axis defined by the single lifting cable or chain of the lifting device LD.

Advantageously, this actuator can bear on the three (or four) gyroscopes 5 to produce this rotation.

In FIG. 2, the torque produced by the gyroscopes 5 will make it possible to cancel the torque induced by the rotating of the print head 2. The assembly with the gyroscopes 5 will not rotate, but the torque produced by the gyroscopes 5 will have made it possible to rotate what is underneath, namely the printing head 2. That makes it possible, among other things, to not rotate the crane hook on which the device can be fixed and to stabilize the position of the printing head 2 during its rotation.

In the devices TDPD2 and 3 represented in FIGS. 3 to 7, it is the torque produced by the gyroscopes 5 which will directly make it possible to rotate the rigid assembly which they form part of, comprising the printing head 2. In these two configurations, TDPD2 and TDPD3, the actuator is primarily composed of the gyroscopes 5.

According to another option, the mobile printing device TDPD0, TDPD1, TDPD2, TDPD3 or TDPD4 can also include displacement means comprising a first translation system 6 adapted to displace the printing head 2 along an axis H at right angles to the vertical axis V, i.e. in a plane parallel to the plane P. In order to ensure the equilibrium of the first translation system 6, the latter can comprise a balancing weight 7 adapted to maintain the equilibrium of the first translation system 6 as a function of the position of the printing head 2 on the axis H of the first translation system 6, as illustrated in FIGS. 2 to 7.

In the case FIG. 2, the first translation system 6 comprises a first and a second rectilinear beam, 6a and 6b, parallel to one another. The printing head 2 is displaced along the first beam 6a, while the balancing weight 7 is displaced along the second beam 6b. The use of two beams makes it possible to increase the amplitude of the translational displacement of the printing head (as close as possible to the vertical axis of rotation V of the device) and therefore the action radius of the device TDPD1.

Thus, when the printing head 2 moves away from the vertical axis 3, the balance weight 7 also moves away from the vertical axis V and, vice versa, when the printing head 2 approaches the vertical axis V. Moreover, it can be advantageous, in the stabilization phase, to move both the printing head 2 and the balancing weight 7 in tandem (i.e. in the same direction) to fight locally against excessive swaying of the device.

Figure 10:
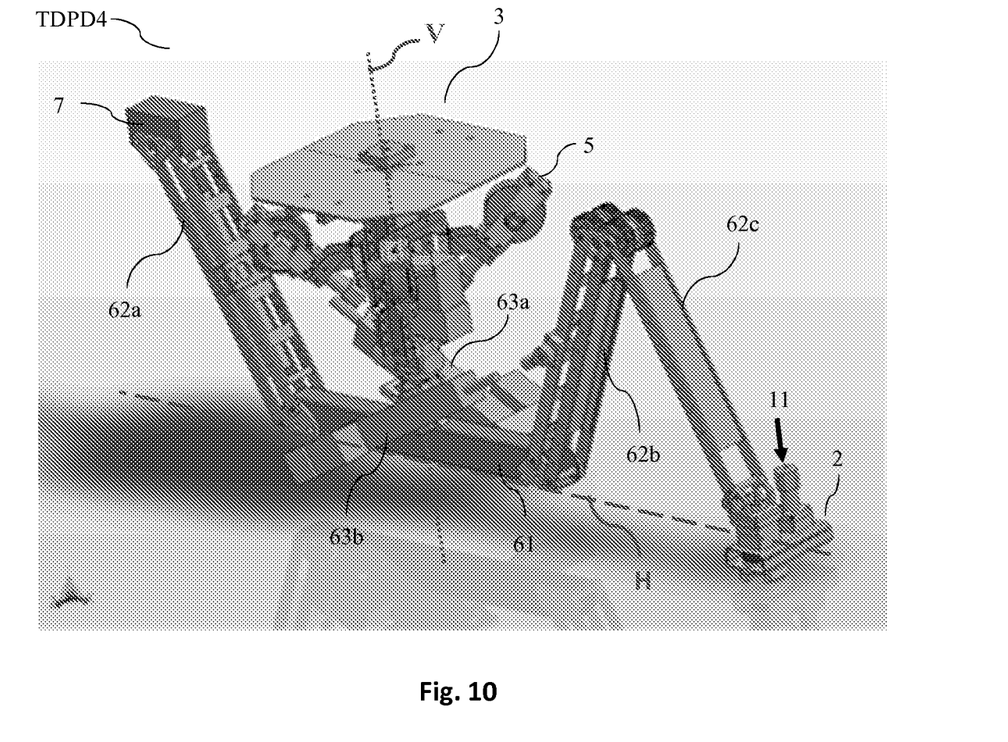
FIG. 10 represents a fourth variant of the general embodiment of the invention.

In the case of FIG. 10, the first translation system 6 comprises an articulated arm allowing the displacement of the printing head 2 along the axis H at right angles to the vertical axis V. This mounting makes it possible to minimize the bulk of the printing device TDPD4.

In this example, the articulated arm is composed of a central beam 61, secondary arms and at least two cylinders 63a and 63b.

A first secondary arm 62a is linked to a first end of the central beam 61 by a pivot link and at least one cylinder 63a making it possible to control the angle of rotation of this first secondary arm 62a. The balancing weight is attached to this first secondary arm 62a.

Likewise, a second secondary arm 62b is linked to the second end of the central beam 61 by a pivot link and at least one cylinder 63b making it possible to control the angle of rotation of this second secondary arm 62b. Then, a third secondary arm 62c comprising the printing head 2 is linked to the end of the second secondary arm 62b by a pivot link, this time with gearing, making it possible to ensure a horizontal displacement of the printing head.

The cylinders 63a and 63b ensure, on one hand, the translation of the printing head on the axis H (for 63b) and, on the other hand, the displacement of the balancing weight (for 63a) making it possible to maintain the equilibrium of the first translation system 6 and to limit disturbances during the deposition of material.

Figure 3:
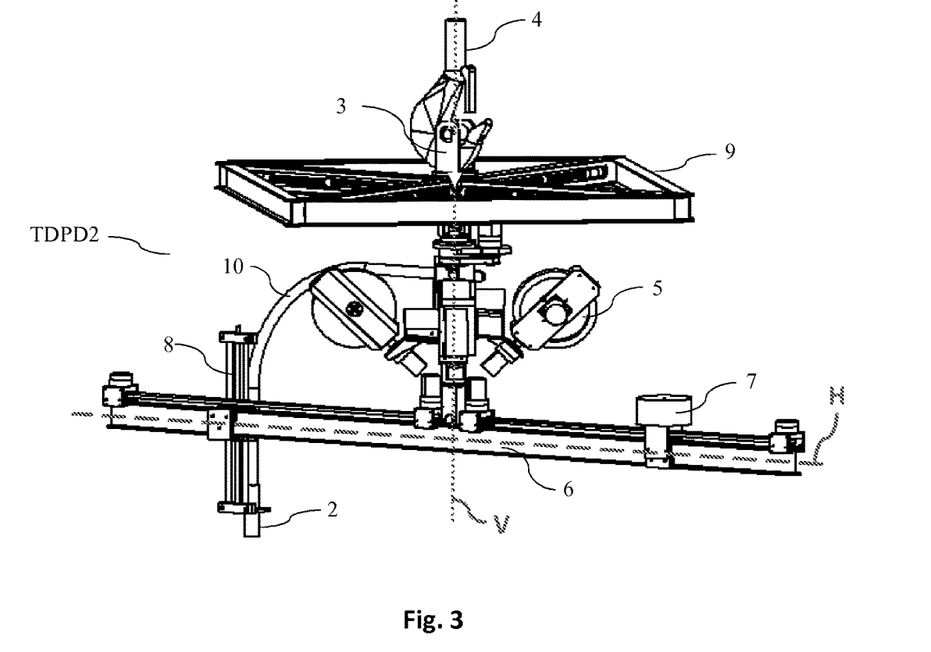
FIG. 3 represents an overview of a printing device according to a second variant of the general embodiment of the invention.
Figure 4:
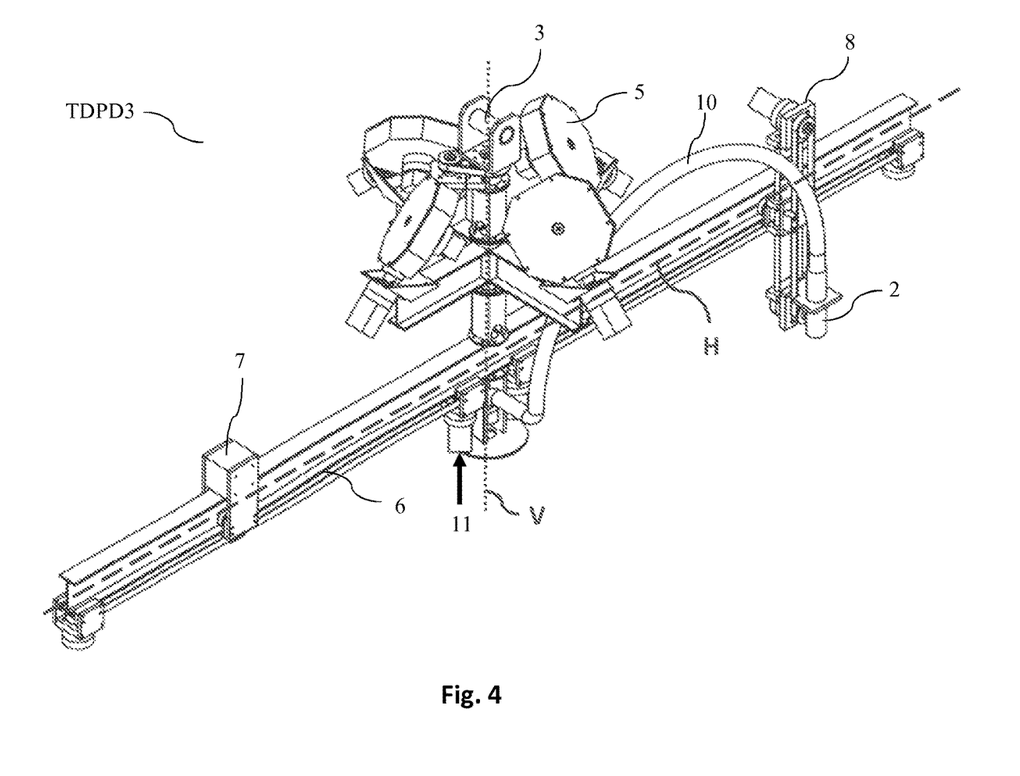
FIG. 4 represents an overview of a printing device according to a third variant of the general embodiment of the invention.
Figure 5:
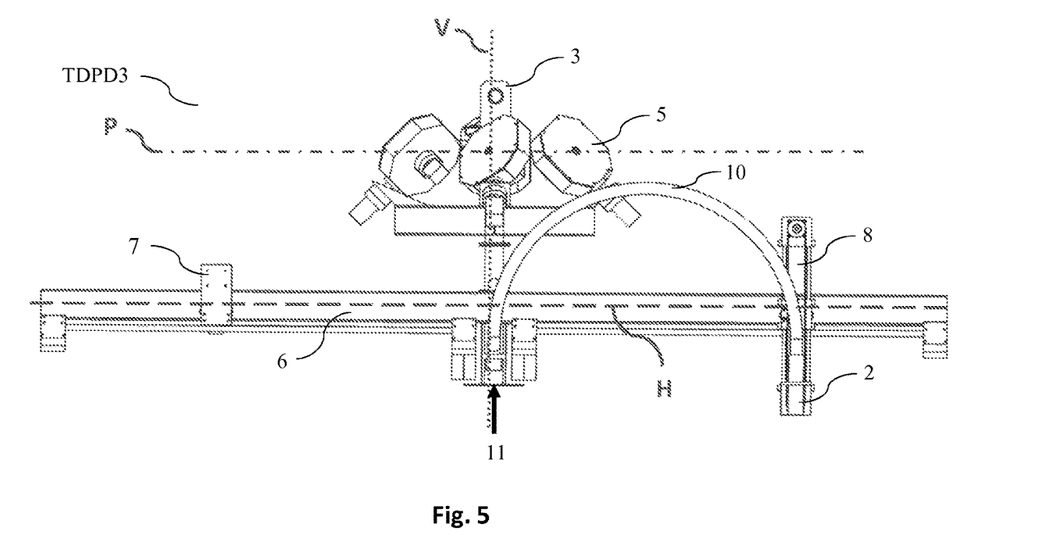
FIGS. 5 and 6 represent side views of the printing device according to the third variant of the general embodiment of the invention.
Figure 6:
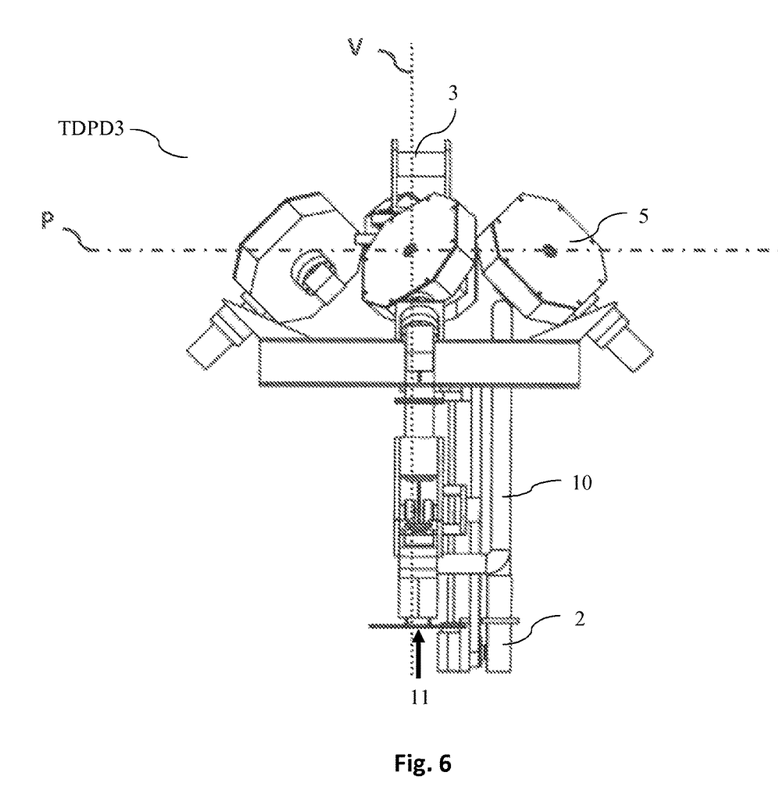
Figure 7:
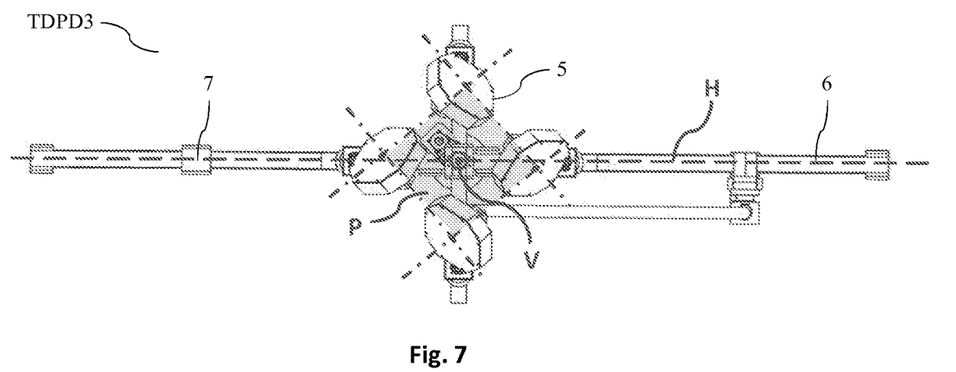
FIG. 7 represents a top view of the printing device according to the third variant of the general embodiment of the invention.

Advantageously, the displacement means also comprise a second translation system 8 adapted to displace the printing head 2 along the vertical axis V. The latter can be a beam or a rail as represented in FIGS. 3 to 5 or it can be a cylinder that can optionally be incorporated into the actuator or below the fixing means so as to translate in one piece all of the rest of the elements of the device (the gyroscopes 5, the translation systems 6 and 8 and the balancing weight 7, and the printing head 2).

The printing head 2 can then have three degrees of freedom:
- a rotation about the vertical axis V ensured by the gyroscopes and possibly a rotary motorized actuator (embodiment TDPD1);
- a translation along the axis H of the first translation system 6, i.e. radially with respect to the vertical axis V; and
- a translation along the vertical axis V by virtue of the second translation system 8.

The first two degrees for freedom make it possible to deposit a layer of material in a plane parallel to the plane (P) and the third degree makes it possible to raise the printing head 2 so as to be able to deposit another layer of material on the former in another plane superposed on the preceding plane.

In order to avoid abrupt, disturbance-generating displacements, the guideways for mobile tubes and cables are preferably provided by cable-supporting chains, as represented by the element 12 of the printing device TDPD1 of FIG. 2. The same applies for the arrival of the material, such as for mortar or concrete, and for the other cables of the system.

According to an option that is compatible with the embodiments described previously, the stabilization means MS can also comprise an inertial stabilization structure 9, as illustrated in FIG. 3, making it possible to increase the stability of the mobile printing device TDPD2. Advantageously, this inertial stabilization structure 9 comprises vibration attenuators further increasing the stability of the mobile printing device TDPD2 and therefore of the printing head 2.

According to another embodiment of the mobile printing device TDPD0, TDPD1, TDPD2, TDPD3 or TDPD4, the latter can also comprise:
- location means adapted to determine in real time the position of the printing head 2 in a geometrical reference frame specific to the structure to be printed; and
- a processing unit PU adapted to servo-control the position of the printing head 2 as a function of its location in the geometrical reference frame of the structure to be printed.

The location of the printing head 2 in the geometrical reference frame of the structure to be printed can be performed in different ways.

Figure 8:
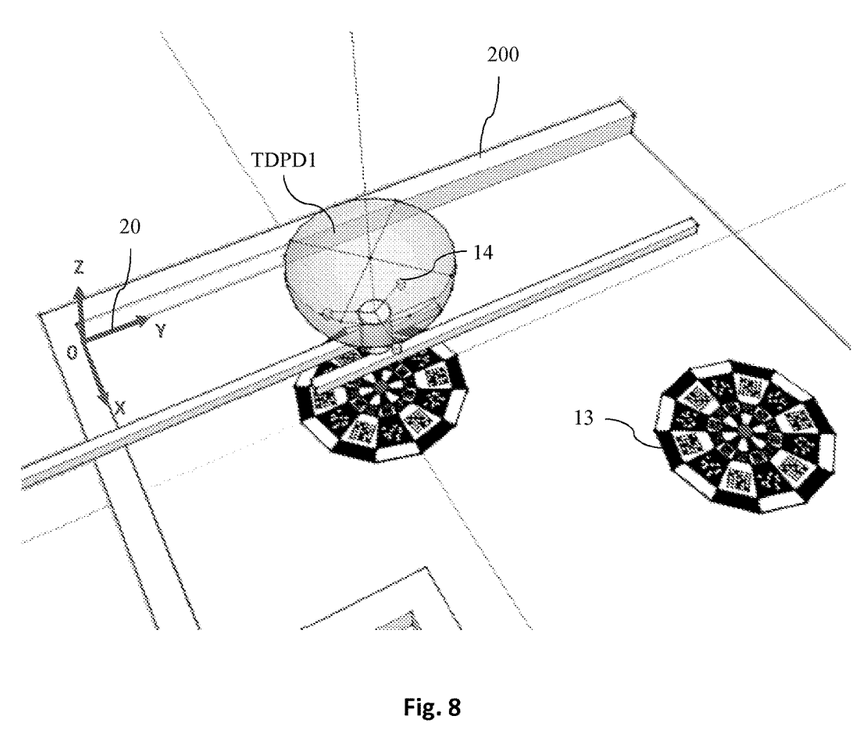
FIG. 8 represents an example of a spotting system for spotting a reference point in the geometrical reference frame of the structure to be printed.

FIG. 8 illustrates a solution consisting in using optical patterns 13 arranged on the ground in the reference frame 20 of the structure to be printed 200 and representing reference points whose position in the geometrical reference frame 20 of the structure 200 is determined. According to this solution, the location means for the printing head 2 are equipped with at least one camera 14 (also visible in FIG. 2) adapted to view the ground and detecting the optical patterns 13. For issues of reliability, in the cases where the pattern would not be visible from certain angles, it is desirable to implement a plurality of cameras. Furthermore, to facilitate the position calculations, it is preferable for the cameras 14 to be fixed and not rotate during the rotation of the printing head 2.

Figure 9:
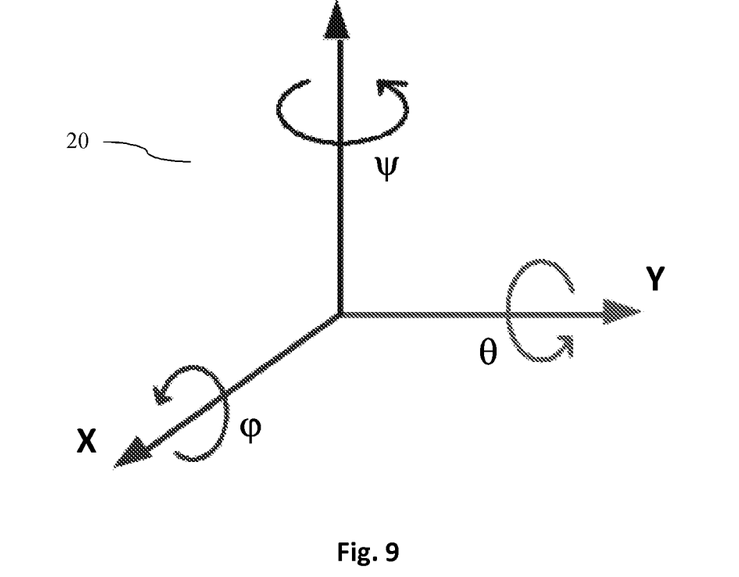
FIG. 9 represents the nomenclature adopted for the angles of rotation about the axes of the reference frame of the printing device.

These location means further comprise:
- an inclinometer having two axes adapted to measure an inclination of the printing device TDPD1 relative to a plane at right angles to the vertical (Z), which corresponds to the measurement of the angles ($\varphi$, $\theta$) represented in FIG. 9; and
- a compass adapted to measure the angle $\psi$ of rotation about the vertical (Z).

The processing unit then uses the images captured by the camera. Since the position of the cameras 14 on the device TDPD1 is known, the processing unit can, with the angular data ($\varphi$, $\theta$, $\psi$), and the position of each reference point in the reference frame 20 of the structure to be printed 200, determine the position of the printing head 2 in this reference frame 20. It should be noted that the angle $\psi$ measured by the compass is not necessary to know the position of the device TDPD1 in space, this angle being able to be deduced from the analysis of the images of the pattern taken by the camera or cameras 14.

According to another solution, the location of the printing head 2 can be performed by triangulation. For that, the geometrical reference frame 20 of the structure to be printed 200 is spotted on the ground using one or more sending or receiving beacons representing the reference points, so that a signal is sent or received by this beacon or these beacons regularly and received or sent by the location means of the mobile printing device TDPD2 or TDPD3, such as one or more receivers positioned accurately on the printing head 2 or on the mobile printing device TDPD2 or TDPD3. The location means then send the received information to the processing unit PU which handles the calculations to locate the printing head 2 in the space of the structure, then calculates and sends to the displacement means (for the translations) and to the actuator (for the rotation), the displacement setpoints matched to the printing path and therefore to the form of the structure to be printed 200.

Different technologies can be used to perform this triangulation: ultrasounds, laser or a centimetric GPS system. However, since the triangulation methods do not always offer measurements that are sufficiently regular (relative to the flowrate of material, or relative to the rate of displacement of the printing head), it may be advantageous, even necessary, to use a complementary measurement system to emulate an increase in the frequency of the measurements and therefore the accuracy of the location of the printing head 2 in the reference frame of the structure to be printed 200.

Thus, the location means can advantageously comprise:
- a spotting system (e.g.: optical patterns or sending beacons) adapted to know the absolute position of at least one reference point in the geometrical reference frame 20 of the structure to be printed 200; and
- a set of sensors adapted to make it possible to locate the position of the printing head 2 relative to the reference point, the processing unit PU being adapted to calculate the position of the printing head 2 in the geometrical reference frame 20 of the structure to be printed 200 using the data from the spotting system and the data from the set of sensors.

The set of sensors could, for example, comprise:
- a sensor adapted to know, at regular time intervals, the absolute position of the printing head in the geometrical reference frame 20 of the structure to be printed 200; and
- an inertial unit adapted to continuously measure the speeds and accelerations of the printing head 2 on three axes, thus making it possible to emulate an increase in the frequency of the measurements and therefore a better accuracy of the location of the printing head 2.

To neutralize any drift in the measurements which could occur, a readjustment on the reference position or positions of the structure to be printed 200 can be performed at regular time intervals.

Advantageously, the printing head 2 is connected to a supply tube 10 for material, such as construction materials of mortar, concrete or cement type, the arrival 11 of which occurs parallel to the vertical axis (V), which makes it possible to reduce the influence of the arrival of the material on the mobile printing device TDPD2 or TDPD3, as the balancing effect. In FIG. 3, the arrival 11 of material occurs from the top of the mobile printing device TDPD2 whereas, in FIGS. 4-6 the latter occurs from the bottom of the mobile printing device TDPD3.

So as to limit the frictions that risk rotating the mobile printing device TDPD2 or TDPD3 on itself and therefore to limit the disturbances, in particular for the deposition of concrete, the supply tube 10 can be linked to a concrete pump comprising an output tube, the two tubes being linked by a combination of revolving joints. Advantageously, the combination of revolving joints can be motorized so as to overcome the friction induced by the material held between the two tubes forming the joint.

According to an option that is compatible with the devices TDPD0, TDPD1, TDPD2, TDPD3 or TDPD4 previously presented, the printing head 2 can be provided with a revolving nozzle allowing a non-rectilinear deposition of the concrete. This type of "zigzag" printing makes it possible to reinforce and rigidify the printed structure.

For safety reasons, the mobile printing device TDPD0, TDPD1, TDPD2, TDPD3 or TDPD4 will be able to be equipped with a weather sensor measuring outside disturbances such as the force of the wind. These measurements will be able to be sent to the processing unit PU which, according to predefined thresholds, will be able to stop the servo-controlling of the printing head 2 and the printing of the structure 200 in order to be set to a "alert" mode in case of danger for the users and people roundabout.

In the case where the environmental conditions might exhibit strong disturbances, the stabilization means can advantageously comprise complementary stabilization means comprising at least three turbines 50 adapted to stabilize the position of the printing head 2 by airflow.

FIGS. 11a to 11c and 12a to 12c represent two embodiments of these complementary stabilization means.

Figure 11A:
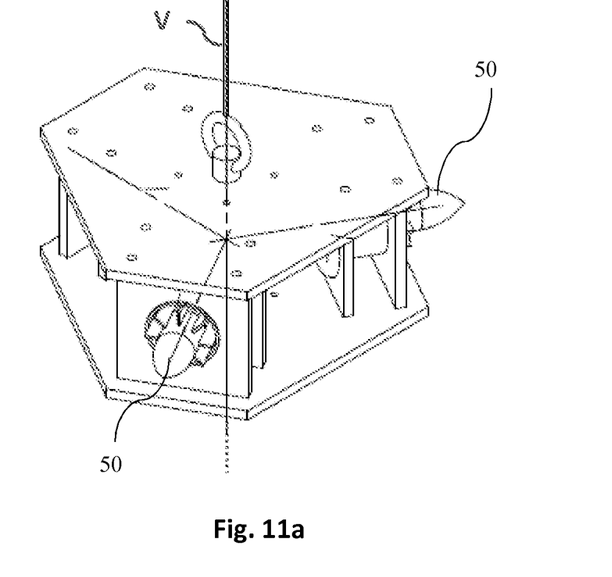
FIGS. 11a to 11c represent complementary stabilization means according to a first embodiment.
Figure 11B:
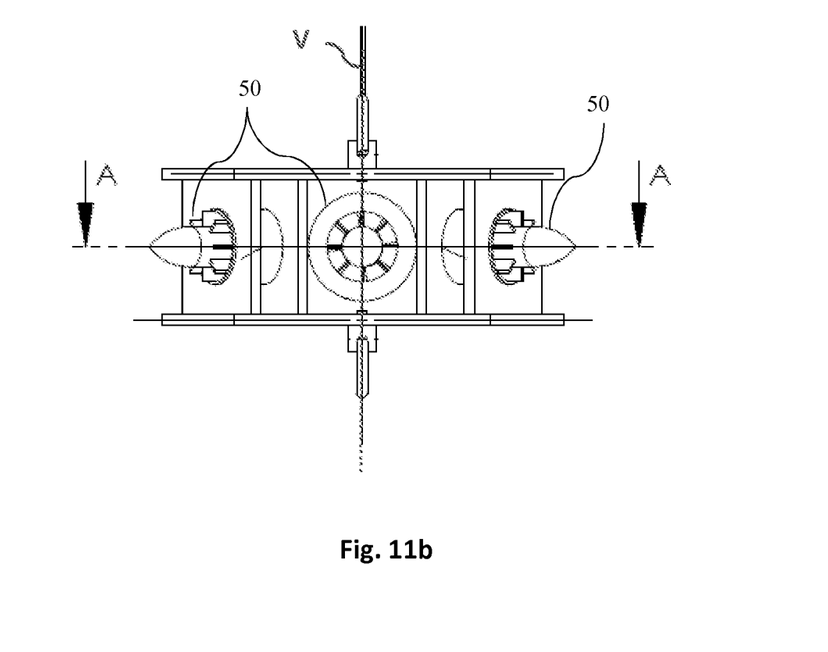
Figure 11C:
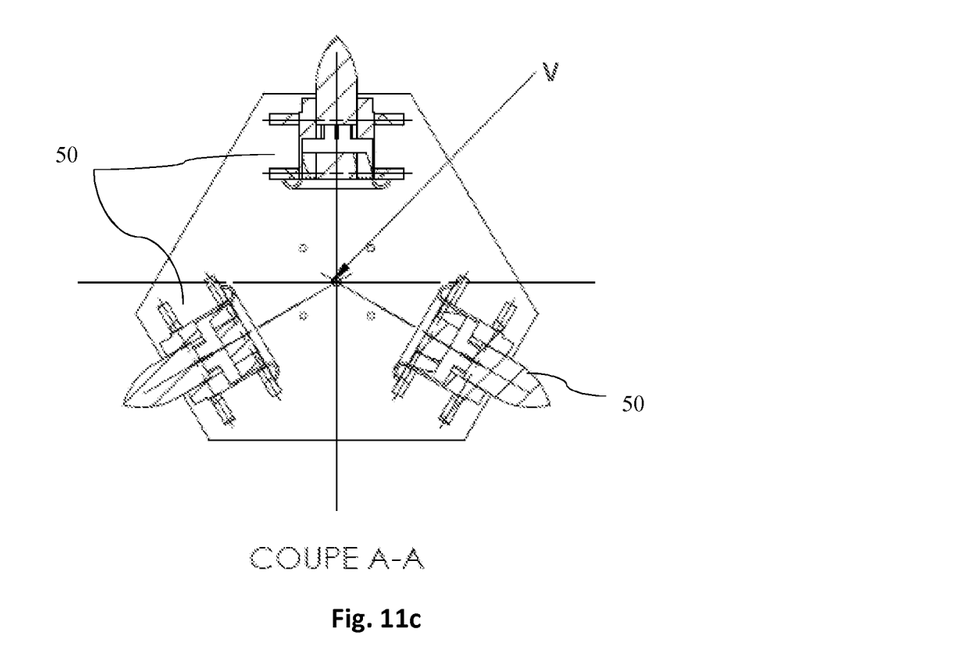

In FIGS. 11a to 11c, the three turbines 50 are horizontal and distributed angularly equidistantly from the lifting axis or vertical axis V defined by the single lifting cable or chain of the lifting device. The air is sucked into the triangle defined by the three turbines 50 then expelled outward from this triangle.

Figure 12A:
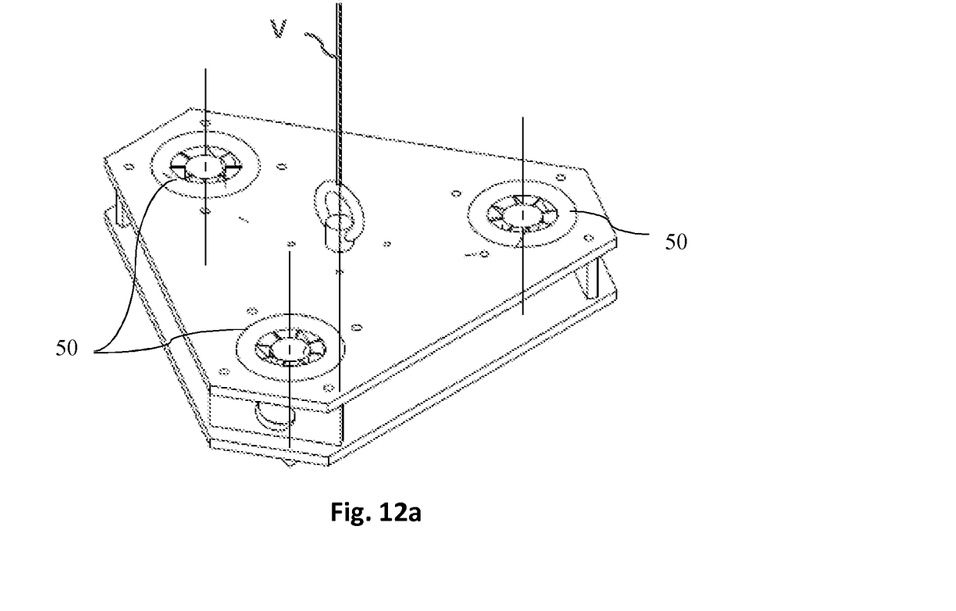
FIGS. 12a to 12c represent complementary stabilization means according to a second embodiment.
Figure 12B:
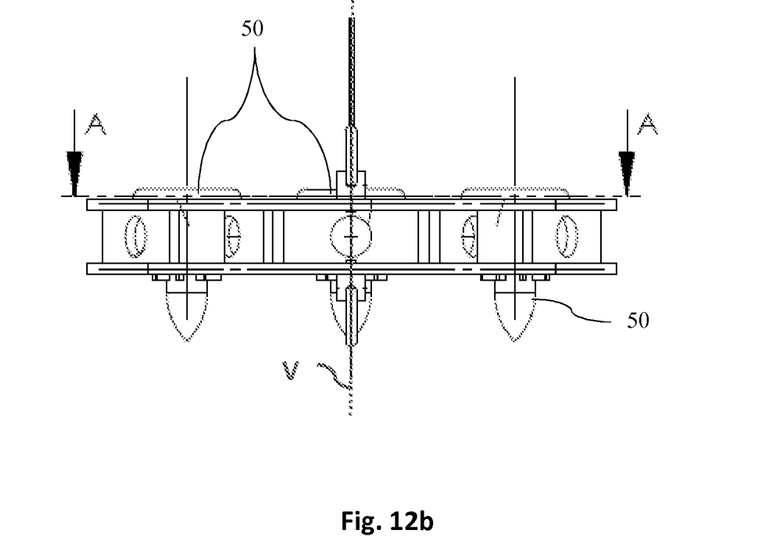
Figure 12C:
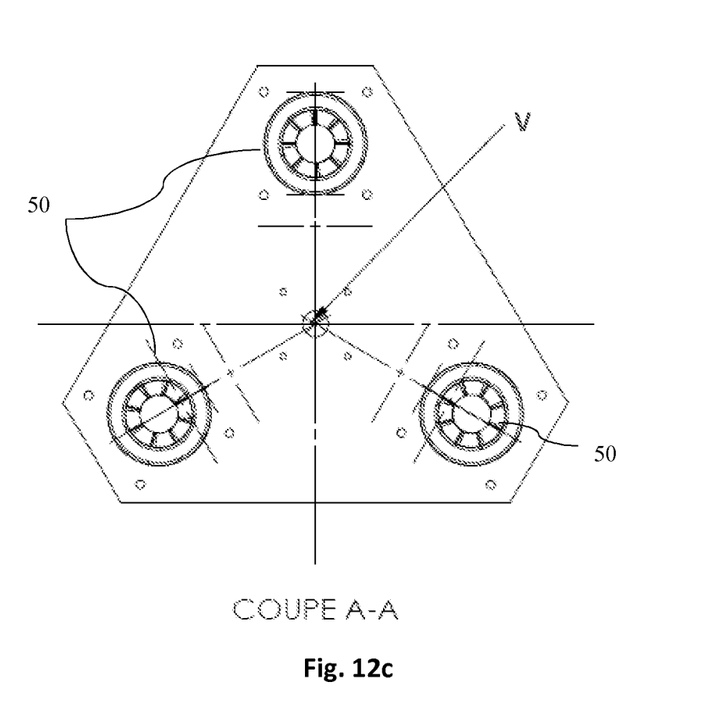

In FIGS. 12a to 12c, the three turbines 50 are vertical and distributed angularly equidistantly from the lifting axis or vertical axis V defined by the single lifting cable or chain of the lifting device. Depending on the direction in which the complementary stabilization means are linked to the rest of the printing device, the air is sucked from the top, that is to say on the side of the single lifting cable or chain (respectively from the bottom, i.e. from the side of the printing head output) relative to the triangle defined by the three turbines 50 then expelled downward (respectively upward).

Whatever the embodiment of these complementary stabilization means, the vector sum of the thrusts produced by the turbines 50 will produce a resulting thrust which will oppose the external loads in order to stabilize the mobile 3D printing device TDPD0, TDPD1, TDPD2, TDPD3 or TDPD4 in a defined position.

Advantageously, the dimensions and the weight of the mobile printing device TDPD0, TDPD1, TDPD2, TDPD3 or TDPD4 are compatible with those of a transport trailer, thus facilitating the moving of the device TDPD0, TDPD1, TDPD2, TDPD3 or TDPD4 from one site to another. Typically, the length of the device will be less than 12 meters and the weight will be less than 1 ton.

Advantageously, the form and the dimensions of the device TDPD0, TDPD1, TDPD2, TDPD3 or TDPD4 are adapted to limit the wind resistance, therefore the influence of external disturbances, when the device is suspended, for example from a worksite crane 4, and used outdoors. In the case where certain elements of the device would be capped, as in FIG. 2, the cap(s) 15 used will have an aerodynamic form.

The present invention relates also to a 3D printing system for the construction of a structure 200 by the deposition of layers of concrete comprising:
  a mobile printing device TDPD0, TDPD1, TDPD2, TDPD3 or TDPD4, according to one of the embodiments previously described;
  a lifting device LD, of crane, travelling overhead crane or telescopic lifting carriage type, capable of suspending and displacing the mobile 3D printing device TDPD0, TDPD1, TDPD2, TDPD3 or TDPD4.

For safety issues, when the external disturbances measured by the meteorological sensor exceed predefined thresholds provoking the stopping of the servo-controlling of the printing head 2 and the printing of the structure 200, the lifting device LD will be able to place the mobile printing device TDPD0, TDPD1, TDPD2, TDPD3 or TDPD4 in a configuration of safety such as the "flag" configuration, in which the device TDPD0, TDPD1, TDPD2, TDPD3 or TDPD4 will naturally be oriented in the direction of the wind so as to thereby limit its effects on the device.

The present invention relates also to a method for the 3D printing of a concrete structure by a 3D printing system as described previously, comprising:
  a first step consisting in defining at least one point and one reference direction in the geometrical reference frame of the structure to be printed using a spotting system and a direction, and in locating the position of the printing head 2 of the printing device TDPD0, TDPD1, TDPD2, TDPD3 or TDPD4 in the geometrical reference frame of the structure to be printed; and
  a second step of printing of the structure consisting in supplying the printing head 2 with construction materials, of concrete, mortar or cement type, and in activating the servo-controlling of the position of the printing head 2 by the processing unit U as a function of the form of the structure to be printed 200.

Advantageously, the servo-controlling of the printing head 2 comprises the deposition of a first layer of material on a plane at right angles to the vertical axis V, the processing unit PU driving the angular and radial positions (i.e. according to the first translation system 6) of the printing head 2 relative to the vertical axis V by sending setpoints suitable for the actuator and for the displacement means of the mobile printing device TDPD0, TDPD1, TDPD2, TDPD3, TDPD4.

Advantageously, the servo-controlling of the printing head 2 also comprises at least one displacement of the printing head 2 along the vertical axis V so as to be able to proceed with the deposition of a new layer of material on the preceding layer of material deposited.

So as to be able to print a structure whose span is greater than the permitted displacement of the printing head 2 by the actuator and the displacement means of the mobile printing device TDPD0, TDPD1, TDPD2, TDPD3 or TDPD4, the method can further comprise at least one additional step of displacement of the mobile printing device TDPD0, TDPD1, TDPD2, TDPD3 or TDPD4 by the lifting device LD between two depositions of a layer of material.

Finally, the present invention relates also to 3D printing software adapted to coordinate the steps of deposition of material of the 3D printing method as defined previously so that the printing of the structure 200 can revert to the position of the printing head 2 prior to displacement of the mobile printing device TDPD0, TDPD1, TDPD2, TDPD3 or TDPD4 by the lifting device LD between two depositions of a layer of material.

The description and the drawings simply illustrate the principles of the invention. It will thus be understood that a person skilled in the art will be capable of devising different variants which, although not explicitly described or illustrated here, incorporate the principles of the invention. Furthermore, all the examples cited here are primarily intended for teaching purposes to assist the reader in understanding the principles of the invention and the concepts added by the inventor to the prior art and should be interpreted as being without limitation to these examples and conditions specifically cited. Moreover, all the statements in which principles, aspects and embodiments of the invention, as well as specific examples thereof, are meant to encompass equivalents thereof.

LIST OF REFERENCE NUMBERS

TDPD0 Mobile printing device according to a general embodiment of the invention (Three-Dimensional Printing Device)
TDPD1 Mobile printing device according to a first variant of the general embodiment of the invention (Three-Dimensional Printing Device)
TDPD2 Mobile printing device according to a second variant of the general embodiment of the invention (Three-Dimensional Printing Device)
TDPD3 Mobile printing device according to a third variant of the general embodiment of the invention (Three-Dimensional Printing Device)
TDPD4 Mobile printing device according to a fourth variant of the general embodiment of the invention (Three-Dimensional Printing Device)
LD Lifting device (Lifting Means)
MS Stabilization means (Means of Stabilization)
PU Processing unit (Process Unit)
2 Printing head
3 Fixing means
4 Crane hook
5 Gyroscope
6 First translation system
6a First rectilinear beam of the first translation system
6b Second rectilinear beam of the first translation system
7 Balancing weight
8 Second translation system
9 Inertial stabilization structure
10 Material supply tube
11 Material arrival
12 Cable-supporting chain
13 Optical pattern
14 Camera
15 Cap
20 Geometrical reference frame of the structure to be printed
50 Turbine
61 Central beam
62 Secondary arm
63 Cylinder
200 Structure to be printed

The invention claimed is:

1. A mobile 3D printing device based on an addition of material, the mobile 3D printing device intended to be attached to a lifting device (LD) with a single lifting cable or chain comprising a single point attachment system for attachment of the mobile 3D printing device to an end of the single lifting cable or chain at a single point, the mobile 3D printing device comprising:
   a printing head adapted to receive material and depositing the material;
   fixing means adapted to link the printing head to the lifting device at the single point presenting a position of the fixing means relative to the single lifting cable or chain,
   the mobile 3D printing device also including,
   stabilization means adapted to stabilize a position of the printing head by a gyroscopic effect, the stabilization means being adapted to act on the position of the fixing means relative to the single lifting cable or chain.

2. The mobile 3D printing device according to claim 1 in which the stabilization means comprise at least three gyroscopes adapted to stabilize the position of the printing head by a gyroscopic effect.

3. The mobile 3D printing device according to claim 1, in which the stabilization means comprise complementary stabilization means comprising at least three turbines adapted to stabilize the position of the printing head by air flow, the three turbines being distributed angularly equidistantly from a substantially vertical lifting axis defined by the single lifting cable or chain of the lifting device.

4. The mobile 3D printing device according to claim 2, further comprising an actuator adapted to rotate the printing head about an axis of rotation, called vertical, at right angles to the plane defined by the three gyroscopes, the stabilization means being adapted to neutralize the disturbances generated by the rotation of the printing head and ensuring the stability of the printing head during the rotation.

5. The mobile 3D printing device according to claim 4, further including displacement means comprising a first translation system adapted to displace the printing head along an axis at right angles to the vertical axis.

6. The mobile 3D printing device according to claim 5, in which the first translation system comprises an articulated arm allowing the displacement of the printing head along the axis at right angles to the vertical axis.

7. The mobile 3D printing device according to claim 5, in which the first translation system comprises a balancing weight adapted to maintain the equilibrium of the first translation system as a function of the position of the printing head on the axis of the first translation system.

8. The mobile 3D printing device according to claim 5, in which the displacement means further comprise a second translation system adapted to displace the printing head along the vertical axis.

9. The mobile 3D printing device according to claim 1, further comprising:
   location means adapted to determine in real time the position of the printing head in a geometrical reference frame specific to the structure to be printed; and a processing unit adapted to servo-control the position of the printing head as a function of its location in the geometrical reference frame of the structure to be printed.

10. The mobile 3D printing device according to claim 9, in which the location means comprise:
a spotting system adapted to know the absolute position of a reference point in the geometrical reference frame of the structure to be printed; and
a set of sensors adapted to allow the position of the printing head to be located relative to the reference point,
the processing unit being adapted to calculate the location of the printing head in the geometrical reference frame of the structure to be printed using the data from the spotting system and the data from the set of sensors.

11. The mobile 3D printing device according to claim 1, in which the printing head is connected to a material supply tube, the arrival of which being made along the vertical axis.

12. The mobile 3D printing device (according to claim 11, in which the material supply tube is linked to a material pump comprising an output tube, the two tubes being linked by a combination of revolving joints.

13. The mobile 3D printing device according to claim 1, in which the printing head is provided with a revolving nozzle allowing for a non-rectilinear deposition of the material.

* * * * *